United States Patent
Chan et al.

(10) Patent No.: US 9,736,039 B2
(45) Date of Patent: *Aug. 15, 2017

(54) METHOD AND SYSTEM FOR IDENTIFYING MATCHING PACKETS

(71) Applicant: Viavi Solutions Inc., Milpitas, CA (US)

(72) Inventors: Lai-chong Chan, Colorado Springs, CO (US); Brian Moody, Colorado Springs, CO (US)

(73) Assignee: Viavi Solutions Inc., Milpitas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/255,348

(22) Filed: Sep. 2, 2016

(65) Prior Publication Data
US 2016/0373320 A1    Dec. 22, 2016

Related U.S. Application Data

(63) Continuation of application No. 14/067,656, filed on Oct. 30, 2013, now Pat. No. 9,438,517.
(Continued)

(51) Int. Cl.
*H04L 12/26* (2006.01)
*H04L 12/801* (2013.01)
(Continued)

(52) U.S. Cl.
CPC .......... *H04L 43/022* (2013.01); *H04L 43/026* (2013.01); *H04L 43/028* (2013.01);
(Continued)

(58) Field of Classification Search
CPC .............. H04L 47/115; H04L 12/5602; H04L 2012/5636; H04Q 11/0478
See application file for complete search history.

(56) References Cited

U.S. PATENT DOCUMENTS

| | | | |
|---|---|---|---|
| 5,072,377 A | | 12/1991 | Asai et al. |
| 5,321,837 A | * | 6/1994 | Daniel ................. G06F 9/542 |

(Continued)

FOREIGN PATENT DOCUMENTS

| | | |
|---|---|---|
| EP | 1 130 850 A2 | 9/2001 |
| EP | 2 298 445 A1 | 9/2012 |

(Continued)

OTHER PUBLICATIONS

Extended European Search Report corresponding to EP 13 85 0496 mailed on Apr. 28, 2016, 11 pages.

*Primary Examiner* — Andrew Chriss
*Assistant Examiner* — Voster Preval
(74) *Attorney, Agent, or Firm* — Harrity & Harrity, LLP

(57) ABSTRACT

In a method of identifying matching packets at different locations in a network, a first plurality of packets is received at a first location in the network, and a first subset thereof is selected in accordance with a filter. A second plurality of packets is received at a second location in the network, and a second subset thereof is selected in accordance with the same filter. Each packet in the first and second subsets is parsed to extract invariant header fields from an outermost IP header inwards, until a minimal set of invariant header fields is obtained for that packet, or until it is determined that a minimal set is not obtainable for that packet. A packet signature is computed from the minimal set for each packet having a minimal set, and the packet signatures are compared to identify matching packets in the first and second subsets.

20 Claims, 3 Drawing Sheets

Related U.S. Application Data

(60) Provisional application No. 61/720,181, filed on Oct. 30, 2012.

(51) Int. Cl.
*H04L 29/06* (2006.01)
*H04L 12/851* (2013.01)

(52) U.S. Cl.
CPC ........ H04L 43/0858 (2013.01); H04L 47/115 (2013.01); H04L 47/34 (2013.01); H04L 69/22 (2013.01); *H04L 43/024* (2013.01); *H04L 43/0852* (2013.01); *H04L 47/24* (2013.01)

(56) References Cited

U.S. PATENT DOCUMENTS

| | | |
|---|---|---|
| 5,517,505 A | 5/1996 | Buchholz et al. |
| 5,521,907 A * | 5/1996 | Ennis, Jr. ............ H04L 41/5038 370/253 |
| 6,873,600 B1 | 3/2005 | Duffield et al. |
| 6,920,112 B1 | 7/2005 | McCloghrie et al. |
| 6,922,417 B2 | 7/2005 | Vanlint |
| 7,292,537 B2 | 11/2007 | Charcranoon |
| 7,573,914 B2 | 8/2009 | Ilnicki et al. |
| 7,689,854 B2 | 3/2010 | Ilnicki et al. |
| 7,760,663 B2 | 7/2010 | Ilnicki et al. |
| 7,894,356 B2 | 2/2011 | Mottishaw et al. |
| 7,961,635 B2 | 6/2011 | Werner et al. |
| 8,243,599 B2 | 8/2012 | Becker et al. |
| 8,341,297 B2 | 12/2012 | Swildens et al. |
| 8,385,212 B2 | 2/2013 | Zampetti et al. |
| 8,427,966 B2 | 4/2013 | Ilnicki et al. |
| 8,639,875 B1 * | 1/2014 | Estan .................... G06F 12/00 707/769 |
| 9,438,517 B2 | 9/2016 | Chan et al. |
| 2003/0135612 A1 | 7/2003 | Huntington et al. |
| 2003/0223367 A1 | 12/2003 | Shay et al. |
| 2004/0083299 A1 | 4/2004 | Dietz et al. |
| 2006/0077902 A1 | 4/2006 | Kannan et al. |
| 2006/0077906 A1 | 4/2006 | Maegawa et al. |
| 2008/0247331 A1 | 10/2008 | Becker et al. |
| 2009/0161547 A1 * | 6/2009 | Riddle ................... G06F 9/526 370/236 |
| 2010/0110916 A1 | 5/2010 | Pratt, Jr. et al. |
| 2011/0149966 A1 | 6/2011 | Pope et al. |
| 2011/0283140 A1 | 11/2011 | Stevens et al. |
| 2011/0305149 A1 | 12/2011 | Scott et al. |
| 2012/0155494 A1 | 6/2012 | Basso et al. |
| 2012/0159132 A1 * | 6/2012 | Abel .................... G06F 9/3885 712/229 |
| 2012/0250519 A1 | 10/2012 | Stevens et al. |
| 2013/0179821 A1 | 7/2013 | Bauer et al. |
| 2013/0223444 A1 * | 8/2013 | Liljenstolpe .......... H04L 61/103 370/392 |

FOREIGN PATENT DOCUMENTS

| | | |
|---|---|---|
| WO | WO 00/31963 A1 | 6/2000 |
| WO | WO 01/01272 A2 | 1/2001 |

* cited by examiner

METHOD AND SYSTEM FOR IDENTIFYING MATCHING PACKETS

CROSS-REFERENCE TO RELATED APPLICATIONS

This application is a continuation of U.S. patent application Ser. No. 14/067,656,filed Oct. 30, 2013 (now U.S. Pat. No. 9,438,517), which claims priority from U.S. Provisional Patent Application No. 61/720,181,filed Oct. 30, 2012,the disclosures of which are incorporated herein by reference.

TECHNICAL FIELD OF THE INVENTION

The present invention relates to identifying matching packets at different locations in a network. More particularly, the present invention relates to identifying matching packets by comparing packet signatures.

BACKGROUND OF THE INVENTION

Conventional techniques for measuring packet transit times, i.e., latencies, through a network, e.g., ping and traceroute, rely on test packets. In these techniques, the test packets arc actively inserted into the network, generating additional network traffic which may degrade the quality of service (QoS) over the network. Moreover, the test packets may not follow the same routes as existing network traffic, leading to inaccurate results.

Techniques relying on packet matching have been developed to overcome some of these problems. In these techniques, matching packets, the same packet at different network locations, are identified in the existing network traffic. A technique in which matching packets arc identified at the edge of the network by comparing packet sequence numbers is disclosed in U.S. Pat. No. 8,243,599 to Becker et al., issued on Aug. 14, 2012, which is incorporated herein by reference, for example. However, a single sequence number docs not provide enough information to uniquely identify each packet throughout the network. Techniques in which matching packets arc identified at different locations in the network by comparing a packet identifier generated from header fields and part of the pay load arc disclosed in U.S. Pat. No. 6,873,600 to Duffield et al., issued on Mar. 29, 2005, and in U.S. Patent Application Publication No. 2006/0077902 to Kannan et al., published on Apr. 13, 2006, which arc incorporated herein by reference, for example. However, in these techniques, the packet identifiers arc generated in a computationally expensive manner from more and/or deeper information than necessary to uniquely identify each packet throughout the network.

Therefore, an improved method and system for identifying matching packets are desirable.

SUMMARY OF THE INVENTION

Accordingly, one aspect of the present invention relates to a method of identifying matching packets at different locations in a network, comprising: receiving a first plurality of packets at a first location in the network; selecting a first subset of the first plurality of packets in accordance with a filter; receiving a second plurality of packets at a second location in the network; selecting a second subset of the second plurality of packets in accordance with the same filter; parsing each packet in the first and second subsets to extract invariant header fields from an outermost internet protocol (IP) header inwards, until a minimal set of invariant header fields is obtained for that packet that uniquely identifies that packet throughout the network, or until it is determined that such a minimal set of invariant header fields is not obtainable for that packet; computing a packet signature from the minimal set of invariant header fields for each packet in the first and second subsets for which a minimal set of invariant header fields is obtained; comparing the packet signatures to identify matching packets having the same packet signature in the first and second subsets.

Another aspect of the present invention relates to a system for identifying matching packets at different locations in a network, comprising: a first probe for receiving a first plurality of packets at a first location in the network; and for selecting a first subset of the first plurality of packets in accordance with a filter; a second probe for receiving a second plurality of packets at a second location in the network; and for selecting a second subset of the second plurality of packets in accordance with the same filter; and a packet-matching unit for parsing each packet in the first and second subsets to extract invariant header fields from an outermost IP header inwards, until a minimal set of invariant header fields is obtained for that packet that uniquely identifies that packet throughout the network, or until it is determined that such a minimal set of invariant header fields is not obtainable for that packet; for computing a packet signature from the minimal set of invariant header fields for each packet in the first and second subsets for which a minimal set of invariant header fields is obtained: and for comparing the packet signatures to identify matching packets having the same packet signature in the first and second subsets.

BRIEF DESCRIPTION OF THE DRAWINGS

The proem invention will be described in greater detail with reference to the accompanying drawings wherein.

DETAILED DESCRIPTION OF THE INVENTION

The present invention provides a method and System for identifying matching packets at different locations in a network. Once matching packets have been identified, latencies between the network locations may be determined. In particular, matching packets may be identified al a plurality of network nodes that share common network traffic lo determine hop-by-hop latencies.

Figure 1:
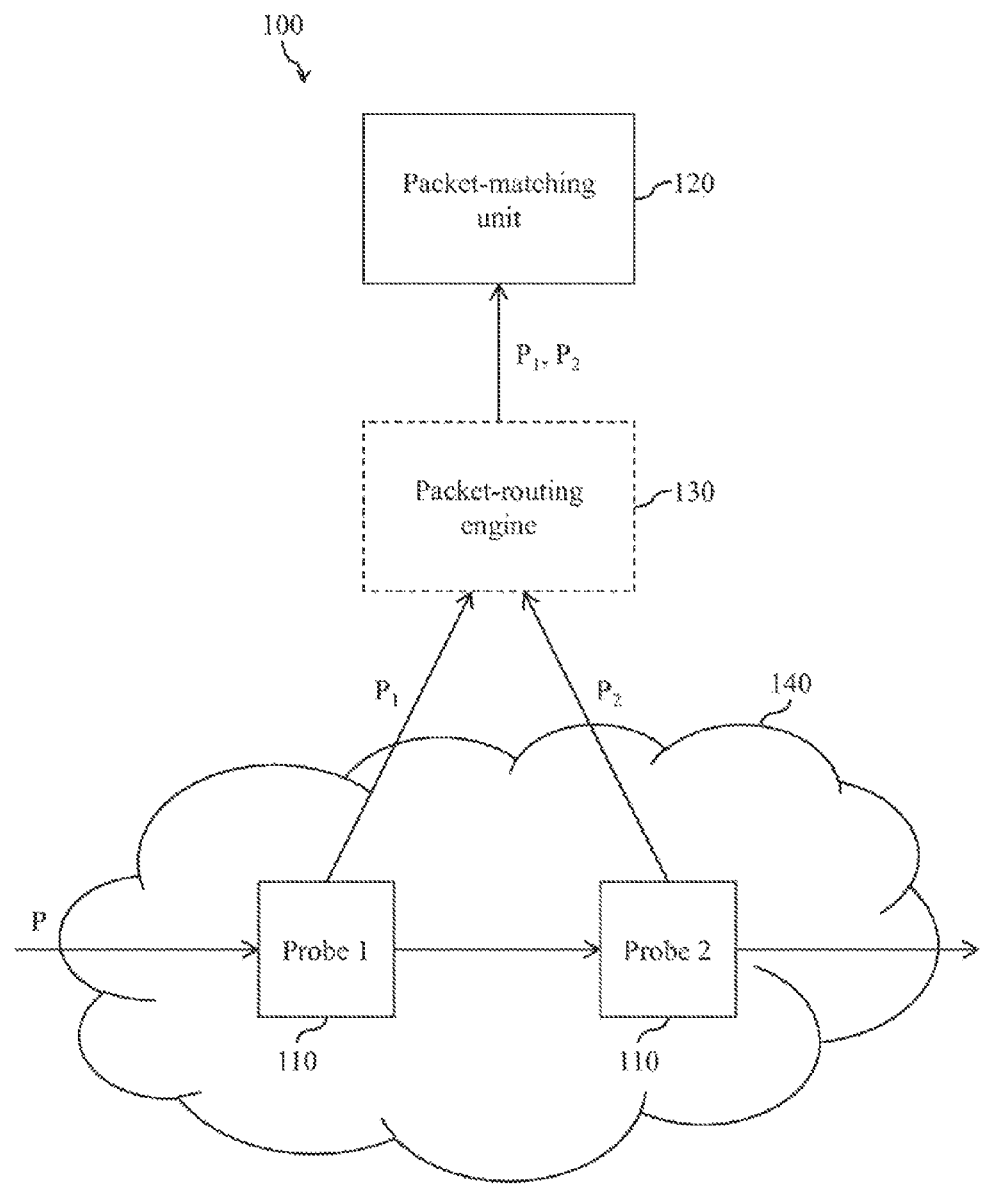
FIG. 1 is a schematic illustration of an exemplary embodiment of a system according to the present invention.

With reference to FIG. 1, a system 100 for identifying matching packets according lo the present invention includes a plurality of probes 310, e.g., 2 to 500 probes, and a packet-matching unit 120. Typically, the system 100 also includes a packet-routing engine 130. The system 100 implements the method of the present invention.

The probes 110 are located at different locations in a network 140 under test, i.e., within the network 140 and/or at the edge of the network 140. The network 140 under test is an Internet protocol (IP)-based network, such as the Internet, a wide area network (WAN), a local area network (LAN), or a mobile network. Typically, the probes 110 arc located at network nodes in the network 140 under test. For example, a probe 110 may be installed at a switch, a router, an access node, e.g., a digital subscriber line access multiplexer (DSLAM), a broadband remote access server (BRAS), a cable modem termination system (CMTS), or an optical line terminal (OLT), or a mobile network node, e.g., a Node B, an evolved Node B (eNodeB), a radio network controller (RNC), or a mobility management entity (MME). Alternatively, the probes 110 may be incorporated into network nodes.

The packet-matching unit 120 and the optional packet-routing engine 130 may be located in the network 140 under test or in another network. The packet-matching unit 120 is in network communication with the probes 130, optionally, via the packet-routing engine 130.

The probes 110 may be implemented as hardware, software, or a combination thereof. When implemented as hardware, the probes 110 are, preferably, inline unaddressed devices. For example, the probes 110 may be eavesdropping devices, intelligent packet directors (IPDs), microprobes, transceivers, or SFProbes™, i.e., modified standard small form-factor pluggable (SFP) transceivers. Examples of suitable hardware implementations are disclosed in U.S. Pat. No. 8,427,966 to Ilnicki et al., issued on Apr. 23, 2013, in U.S. Patent Application Publication No. 2011/0283140 to Stevens et al., published on Nov. 17, 2011, in U.S. Patent Application Publication No. 2011/0305149 to Scott et al., published on Dec. 15, 2011, and in U.S. Patent Application Publication No. 2013/0179821 to Bauer et al., published on Jul. 11, 2013, which are incorporated herein by reference. When implemented as software, typically, the probes 110 are embodied in non-transitory computer-readable storage media, e.g., memory, and the actions carried out by each probe 110 are executed by the processor of a hardware device, e.g., a network server or a general purpose computer.

The packet-matching unit 120 and the optional packet-routing engine 130 may also be implemented as hardware, software, or a combination thereof. Typically, the packet-matching unit 120 and the optional packet-routing engine 130 are implemented as software embodied in non-transitory computer-readable storage media, e.g., memory, and the actions carried out by each of the packet-matching unit 120 and the optional packet-routing engine 130 are executed by the processor of a hardware device, e.g., a network server or a general purpose computer.

In operation, the probes 110 select and capture, i.e., selectively capture, network traffic, as directed by the packet-matching unit 120. Each probe 110 receives a plurality of packets from the network 140 under test, usually, bidirectionally, and selects a subset of the plurality for capture in accordance with a filter. Generally, the selected subset of network traffic includes at least some packets having different protocol combinations, e.g., different combinations of network, transport, and/or session protocols. Preferably, this selective capture is performed passively, meaning that the selected packets are captured but not altered, and the existing network traffic is not disrupted.

The probes 110 are each programmed with a filter that defines the subset of network traffic to be selectively captured. All of the probes 110 are programmed with the same filter, so that the same packet can potentially be captured on all of the probes 110 at different locations in the network 140 under test. In other words, there should be significant overlap between the subsets of packets captured at each of the probes 110. For this reason, random sampling cannot be used.

The filter includes at least one filter condition based on a header field, typically, an invariant header field, i.e., a header field in a packet that does not vary as the packet traverses the network 140. Generally, an invariant header field is selected that has a high variance from packet to packet, such as an identifier (ID) or sequence number, e.g., an IP version 4 (IPv4) ID, an authentication header (AH) sequence number, a transmission control protocol (TCP) sequence number, a real-time transport protocol (RTP) sequence number, or a stream control transmission protocol (SCTP) data chunk transmission sequence number (TSN).

When based on an ID or sequence number, the filter condition, typically, defines the entire ID or sequence-number space or a non-unitary subset thereof, depending on the network traffic load. When the filter condition defines a non-unitary subset of an ID or sequence number space, it is preferable that the filter condition be bused on the least significant bits, so that the packet samples arc more evenly spaced. For example, a filter condition with the lower 4 bits of the IPv4 ID set to 0001 will capture about 1 out of every 16 IPv4 packets.

Typically, the filter is specified by a filter expression, e.g., a regular expression or pattern, composed of one or more matching expressions, specifying filter conditions, linked by logical operators.

The filter is configured by the packet-matching unit 120, optionally, via the packet-routing engine 130. An example of a suitable technique for configuring filters is disclosed in U.S. Pat. No. 7,760,663 to Ilnicki et al, issued on Jul. 20, 2010, which is incorporated herein by reference.

The initial filter condition is, typically, set according to a user's requirements, e.g., to capture packets of interest, to capture less than a specified percentage of the network traffic, to capture less than a specified percentage of the link capacity, and/or to capture less than a specified number of packets per time interval. Preferably, the filter is dynamically and adaptively configured by the packet-matching unit 120 to ensure that sufficient potentially matching packets are captured without burdening the network 140. Filter conditions may be added, removed, or adjusted by the packet-matching unit 120 in accordance with the network traffic load and the number of captured packets, as described in further detail hereafter.

The probes 110 each inspect the packets in the network traffic as they are received to determine whether they match the filter. Typically, the packets are examined at full-duplex line-rate speeds. When a packet matches the filter, that packet is selected and captured, i.e., copied, as it passes through the probe 110. The captured packet is assigned a capture timestamp that represents the time at which the packet was captured. The probes 110 are, typically, synchronized with a global time source, such as a global positioning system (GPS), network time protocol (NTP), or IEEE 1588 master clock, M disclosed, for example, in U.S. Pat. No. 7,573,914 to Ilnicki et al., issued on Aug. 11, 2009, and in U.S. Pat. No. 7,689,854 to Ilnicki et al., issued on Mar. 30, 2010, which are incorporated herein by reference. Typically, the capture timestamp is added to the captured packet, along with a capture probe ID that identifies the probe 110 at which the packet was captured. The captured packet is then forwarded to the packet-matching unit 120.

In an exemplary embodiment, the captured packet, i.e., the copy of the packet, is placed into a filter result packet (FRP), along with the capture timestamp, the capture probe ID, and other metadata, such as a capture sequence number. The FRP is then inserted back into the network traffic for routing to the packet-matching unit 120, optionally, via the packet-routing engine 130, without disrupting the existing network traffic. Examples of suitable techniques for using FRPs are disclosed in U.S. Pat. No. 7,894,356 to Mottishaw et al., issued on Feb. 22, 2011, in U.S. Patent Application Publication No. 2011/0305149 to Scott et al., published on Dec. 15, 2011, and in U.S. Patent Application Publication No. 2012/0250519 to Stevens et al., published on Oct. 4, 2012, which are incorporated herein by reference.

The optional packet-routing engine 130 facilitates communications between the packet-matching unit 120 and the probes 110. The probes 110 may be discovered, configured, and synchronized through the packet-routing engine 130. The optional packet-routing engine 130 also facilitates routing of the captured packets from the probes 110 to the packet-matching unit 120.

The packet-matching unit 120 receives the captured packets, i.e., the selected subset of network traffic, from each probe 110, optionally, via the packet-routing engine 130. For efficiency, a packet signature is computed for each of the captured packets. As the captured packets are received, i.e., in real time, the packet-matching unit 120 parses each captured packet to compute a packet signature for that packet. Packets captured at different probes 110, within a matching window, i.e., a predetermined time interval, having the same packet signature have a high likelihood to be the same packet and are considered to be matching packets. By comparing the packet signatures, matching packets may be identified.

Depending on the network locations of the probes 110 at which they were captured, matching packets may have different outer network encapsulations, e.g., Ethernet, VLAN, and/or multi-protocol label switching (MPLS) encapsulations. However, matching packets will maintain the same values in some inner header fields, referred to as invariant header fields, as they traverse the network 140. Suitable examples of invariant header fields include source and destination addresses, IDs, and sequence numbers. Some of these invariant header fields have a high level of variance among non-matching packets and may be used, in combination, to uniquely identify sets of matching packets.

In order to minimize computational costs, the packet signature is computed from a minimal set of invariant header fields, e.g., a minimum set of invariant header fields, that uniquely identifies a particular packet throughout the network 140 within the matching window. The minimal set is a small subset of the invariant header fields present in the particular packet, generally, the smallest subset that will uniquely identify the particular packet. The minimal set must be highly likely to vary from packet to packet within the matching window, but must not vary for a particular packet as it traverses the network 140. The matching window must be long enough to allow a packet 10 traverse the network 140, but short enough to minimize the likelihood of the same signature being computed for different packets.

In general, the minimal set mast have the properties of (1) being able to uniquely identify a particular packet throughout the network 140 for the lifetime of that packet, and (2) being invariant at different locations in the network 140. In other words, the minimal set must be distinct and invariant.

Accordingly, the minimal set depends on the particular protocol layers, e.g., network, transport, and/or session layers, present in the particular packet. i.e., on the particular protocol combination of that packet. In general, minimal sets are predetermined for various protocol combinations. Typically, the minimal set includes an IP source address, an IP destination address, and at least one additional invariant header field, such as an ID or a sequence number.

For example, a minimal set for an IPv4 packet may consist of an IPv4 source address, an IPv4 destination address, a non-zero IPv4 ID, and an IPv4 fragment offset. According to Request for Comments (RFC) 791 and 6864, the IPv4 ID of a packet, when non-zero, must be unique for that IPv4 address pair for the time the packet will be active in the network 140. The IPv4 ID can, therefore, be used as part of the minimal set. On the other hand, while the user datagram protocol (UDP) checksum of a packet is invariant at different locations in the network 140, it is not guaranteed, or even particularly likely, to vary from packet to packet, and therefore, cannot be used as part of the minimal set for that packet.

When parsing each captured packet, the packet-matching unit 120 parses each protocol layer on the fly, i.e., dynamically. The packet-matching unit 120 parses the captured packet header by header, i.e., layer by layer, from outside to inside. Based on how an outer header is parsed, the packet-matching unit 120 determines the next header to parse and how to parse it, and so on.

In attempting to obtain a minimal set, the packet-matching unit 120 ignores the outer network encapsulation and extracts invariant header fields starting from an outermost IP header. If a minimal set is not obtained from the outermost IP header, the packet-matching unit 120 goes on to the next header, and so on. The packet-matching unit 120 proceeds inwards, i.e., deeper into the captured packet, and continues parsing the packet to extract invariant header fields until a minimal set of invariant header fields is obtained for that packet or until it is determined that a minimal set is not obtainable.

For some captured packets having particular protocol combinations, the packet-matching unit 120 will determine that a minimal set is not obtainable. In general, a minimal set is not obtainable for protocol combinations having no known ID or sequence number that can potentially uniquely identify u particular packet at different network locations, e.g., protocol combinations involving UDP or address resolution protocol (ARP). For example, a minimal set is not obtainable for UDP/IPv4 packets having an IPv4 ID of zero and no AH on non-well-known UDP ports, because the UDP checksum will be the same if it has the same UDP pseudo header and payload.

Figure 2:
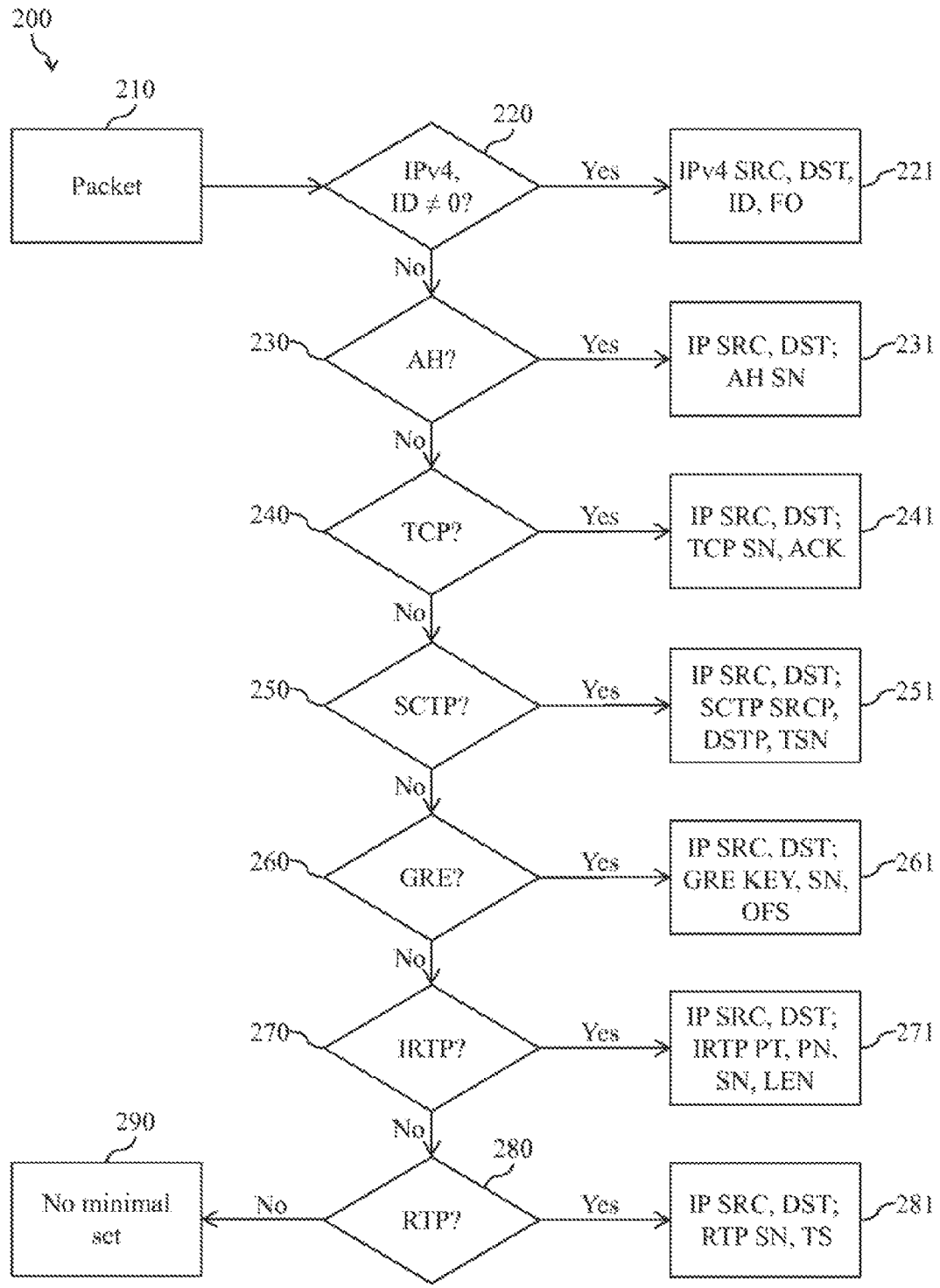
FIG. 2 is a flow diagram of an exemplary embodiment of a method of obtaining a minimal set of invariant header fields according lo the present invention.

An exemplary method 200 of obtaining a minimal set of invariant header fields for a particular packet 210 is illustrated in FIG. 2. At step 220, if the packet includes an IPv4 header and a non-zero IPv4 ID, the minimal set 221 consists of the IPv4 source address, the IPv4 destination address, the IPv4 ID, and the IPv4 fragment offset. Else, at step 230, if the packet includes an AH, the minimal set 231 consists of the IPv4 or IP version 6 (IPv6) source address, the IPv4 or IPv6 destination address, and the AH sequence number. Else, at step 240, if the packet includes a TCP header, the minimal set 241 consists of the IPv4 or IPv6 source address, the IPv4 or IPv6 destination address, the TCP sequence number, and die TCP acknowledgement number. Else, at step 250, if the packet includes an SCTP header and data chunk header, the minimal set 251 consists of the IPv4 or IPv6 source address, the IPv4 or IPv6 destination address, the SCTP source port, the SCTP destination port and the SCTP data chunk TSN. Else, at step 260, if the packet includes a generic routing encapsulation (ORE) header with sequence number and key, the minimal set 261 consists of the IPv4 or IPv6 source address, die IPv4 or IPv6 destination address, the GRE key, the GRE sequence number, and the GRE offset Else, at step 270, if the packet includes an internet reliable transaction protocol (IRTP) header, the minimal set 271 consists of the IPv4 or IPv6 source address, the IPv4 or IPv6 destination address, the IRTP packet type, the IRTP port number, the IRTP sequence number, and the IRTP length. Else, at step 280, if the packet includes an RTP header, the minimal set 281 consists of the IPv4 or IPv6 source address, the IPv4 at IPv6 destination address, the RTP sequence number, and the RTP timestamp. Note that, since RTP is not run on well-known port, the technique of step 280 relies on the RTP ports being provided by a user or discovered through analysis of the real-time transport control protocol (RTCP). Else, at step 290, it is determined that a minimal set is not obtainable.

For each captured packet for which a minimal set is obtained, the packet-matching unit 120 computes a packet signature from the minimal set of invariant header fields. The packet-matching unit 120 stores the packet signature of the captured packet in memory, along with the capture time-stamp and, preferably, the capture probe ID. Typically, the packet signature is stored in memory along with the captured packet. A packet signature is not computed for captured packets for which a minimal set is not obtained, and these packets will not usually be stored or used for identifying matched packets. The packet-matching unit 120 compares the packet signatures of the captured packets to identify matching packets, i.e., the same packet captured at different network locations.

In an exemplary embodiment, the packet-matching unit 120 computes the packet signature by applying a hash function. e.g., MurmurHash2, to the minimal set of invariant header fields. A 64-bit packet signature is usually sufficient for uniqueness and efficiency. The packet-matching unit 120 stores the captured packets in a hash table indexed by the packet signature, referred to as a packet hash table. The packet-matching unit 120 also forms an ordered queue of references to the captured packets according to capture timestamp, referred to as a packet queue. Both the packet hash table and the packet queue arc stored in memory.

In this embodiment, upon receipt of a new captured packet, its packet signature is computed as described heretofore. The packet-matching unit 120 inserts the captured packet into the packet hash table by packet signature. As multiple captured packets may have the same packet signature, a hash table implementation is selected that can handle this. The packet-matching unit 120 also inserts a reference to the captured packet into the packet queue by capture timestamp.

The packet-matching unit 120 receives captured packets over a predetermined time interval, e.g., 0.1 to 1 s, referred to as a matching window. The matching window should be long enough to encompass die worst-case lifetime of a packet traversing the network 140, but short enough lo not degrade the uniqueness of the packet signature. Usually, the matching window is specified by a user and is based on the service level agreement (SLA) for the network 140 under test.

The packet-matching unit 120 then looks at the head of the packet queue. If the packet reference al the head of the packet queue has been there for the predetermined time interval of the matching window, the packet-matching unit 120 finds all of the captured packets having the same packet signature as the referenced packet in the packet hash table. These packets, referred to as matching packets, represent the same packet captured at different network locations. The packet-matching unit 120 removes the matching packets from the packet hash table and removes the references to the matching packets from the packet queue. If the packet-matching unit 120 does not find any packets having the same packet signature as the referenced packet, that packet is simply discarded.

Once matching packets have been identified, the packet-matching unit 120, typically, determines latencies for network segments by comparing the capture timestamps of the matching packets. The latency for a network segment defined by two probes 110, i.e., between the network locations of two probes 110, is calculated as the absolute difference between the capture timestamps of at least one pair of matching packets captured at the two probes 110. Usually, the packet-matching unit 120 calculates the average, minimum, and/or maximum latencies for the network segment over a predetermined time interval.

In an exemplary embodiment, hop-by-hop latency calculations for a network segment defined by two probes 110 are carried out as follows. Over the predetermined time interval of the matching window, e.g., 0.1 to 1 s, the packet-matching unit 120 identifies pairs of matching packets having capture timestamps X1 and X2 at the two probes 110, respectively. The latency for each pair of matching packets is calculated as the absolute difference between the respective capture timestamps, i.e., |X2−X1|. The average latency for the network segment is the average of the latencies calculated for the pairs of matching packets, i.e., (sum(|X2−X1|))/n, where n is the number of pairs identified in the predetermined time interval. The minimum and maximum latencies for the network segment are the minimum and maximum, respectively, of the latencies calculated for the pairs of matching packets identified in the predetermined time interval, i.e., min(|X2−X1|) and max (|X2−X1|), respectively.

In addition, the packet-matching unit 120 may calculate frame delay variations (FDVs), e.g., the average, minimum, and/or maximum FDVs, for the network segment over the predetermined time interval. The packet-matching unit 120 may similarly calculate one-way end-to-end latencies and FDVs, provided that the topological layout of the probes 110 has been supplied by a user or discovered automatically. Optionally, the packet-matching unit 120 may also determine the number of hops between the two probes 110 from the time to live (TTL) fields of the matching packets and/or the topology of the network segment from the network encapsulation, e.g., MPLS labels, VLAN IDs, and/or IP versions, of the matching packets.

For each pair of matching packets, the packet-matching unit 120 determines the probes 110 at which the matching packets of the pair were captured, from the capture probe IDs associated with the pair, and the latencies between those probes 110.

Of course, this analysis may be extended to larger network segments defined by more than two probes 110 by identifying sets of matching packets captured at the probes 110. In addition, lost packets may be inferred by examining the sets of matching packets. Furthermore, by using a suitable number of suitably located probes 110, packet routes and transit times through the network 140 may be determined, and the network topology may be mapped.

The packet-matching unit 120 also, typically, counts the number of captured packets and the number of matching packets for each probe 110, from which the total number of captured packets and the total number of matching packets for all the probes 110 may be obtained. Preferably, the packet-matching unit 120 also counts the sets, e.g., pairs, of matching packets per IP address pair.

The packet-matching unit 120 stores the results, as they arc generated, in memory, typically, in a file, e.g., a text file, or a comma-separated value (CSV) file, or a database.

Advantageously, the collected results may be used to adjust the filter used by the probes 110 to capture packets.

Typically, the packet-matching unit 120 uses the total number of packets captured at the probes 110 to adjust the filter. If the total number of packets captured over a predetermined time interval is too low, e.g., less than a predetermined threshold, the packet-matching unit 120 will adjust a filter condition to capture more packets, i.e., to be less restrictive, or will add or switch to a filter condition to capture a different kind of network traffic. Preferably, the new filter condition is based on an invariant header field, in a different protocol layer, that was identified in a captured packet. If the total number of captured packets over the predetermined time interval is too high, e.g., greater than a predetermined threshold, the packet-matching unit 120 will adjust a filter condition to capture fewer packets, i.e., to be more restrictive. The filter is adjusted continuously in response to real-time network utilization and changes in network traffic patterns. In this way, the filter is dynamically and adoptively configured, i.e., fine-tuned, so that the probes 110 capture as many potentially matching packets as allowable without burdening the network 140.

Figure 3:
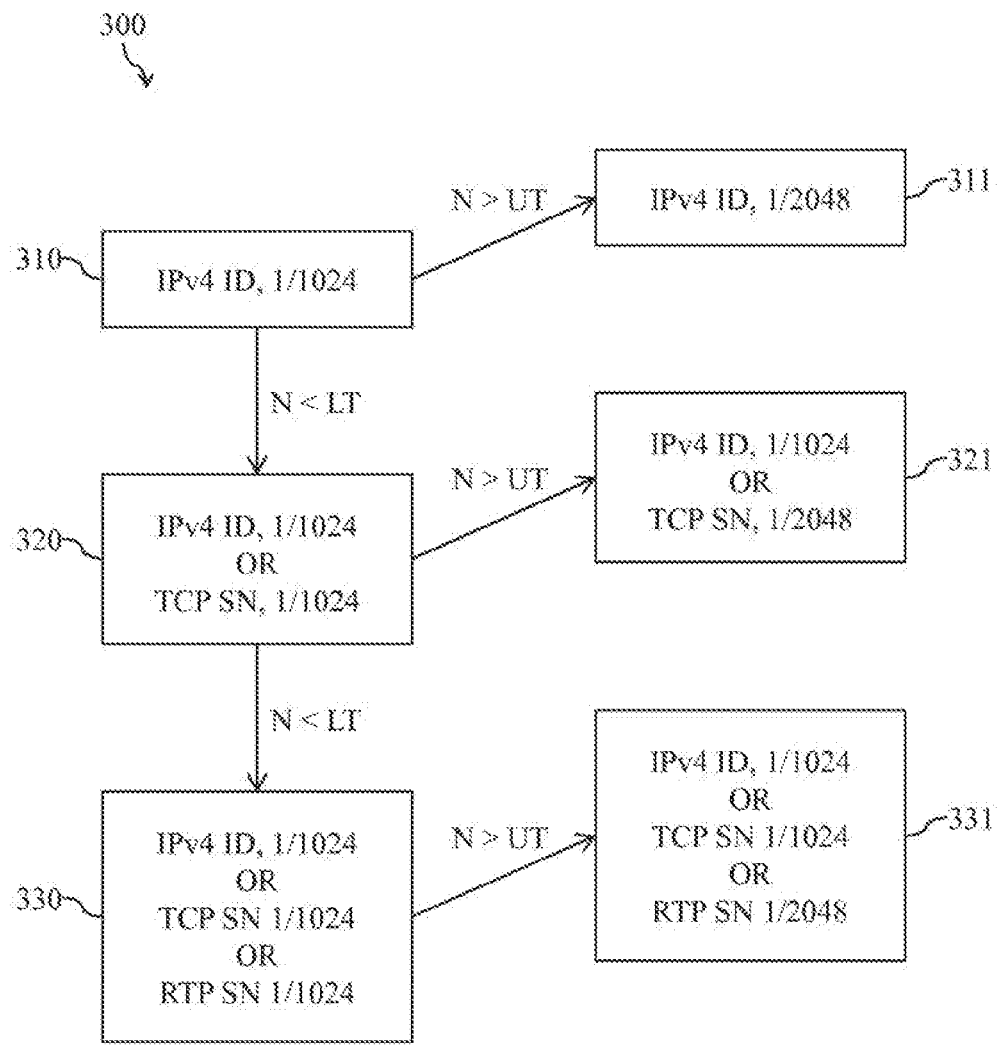
FIG. 3 is a flow diagram of an exemplary embodiment of a method of adjusting a fitter according to the present invention.

An exemplary method 300 of adjusting the filter is illustrated in FIG. 3. Prior to starting selective capture at the probes 110, a user specifies an upper threshold UT corresponding to the maximum allowable bandwidth for packet capture, e.g., 50% of the network traffic, 5% of the link capacity, or 10 000 packets in a 30 s time interval, as well as a time interval for packet capture, e.g., 0.5 to 5 minutes. A corresponding lower threshold (LT) is also set by the user or automatically.

At step 310, the packet-matching unit 120 sets an initial filter condition at the probes 110 according to these predetermined parameters. In this instance, the initial filter condition is based on IPv4 ID and captures 1 out of every 1024 IPv4 packets. The packet-matching unit 120 captures and processes packets over the predetermined time interval. At step 311, if the total number of packets N captured or expected to be captured over the predetermined time interval is greater than the predetermined upper threshold UT, i.e., if N>UT, the initial filter condition is adjusted to capture 1 out of every 2048 IPv4 packets. It should be noted that the packet-matching unit 120 will, generally, slop packet capture immediately once the predetermined upper threshold is reached in the predetermined time interval, so that the threshold is not exceeded. At step 320, if the total number of packets N captured over the predetermined time interval is less than the predetermined lower threshold LT, i.e., if N<LT, a second filter condition based on TCP sequence number is added, linked by a logical OR operator, that captures 1 out of every 1024 TCP packets. At step 321, if N>UT, the second filter condition is adjusted to capture 1 out of every 2048 TCP packets. At step 330, if N<LT, a third filter condition based on RTP sequence number is added, linked by a logical OR operator, that captures 1 out of every 1024 RTP packets. At step 331, if N>UT, the third filter condition is adjusted to capture 1 out of every 2048 RTP packets. When LT<N<UT, the filter condition is not adjusted.

Preferably, the packet-matching unit 120 uses the number of sets of matching packets per IP address pair to identify IP address pairs that are associated with the greatest number of sets, i.e., "top talkers". A user may select one or more of the IP address pairs to track, or the packet-matching unit 120 may make the selection automatically. The packet-matching unit 120 then adjusts the filter accordingly by adding or switching to filter conditions capturing only the selected IP address pairs. For example, if the IP address pair A/B is associated with 100 sets of matching packets captured using an initial 1/1000 filter condition based on IPv4 ID over a predetermined time interval of 1 s, then A is sending about 100 000 packets/s to B. If the predetermined upper threshold is a maximum bandwidth of 16 000 packets/s, then the initial filter condition is adjusted to capture 1 of every 16 IPv4 packets, and a second filter condition is added, linked by a logical AND operator, to capture only packets having the IP address pair A/B.

The packet-matching unit 120 may also use the calculated latencies to adjust the filter. If a network segment has an unusual latency pattern, the packet-matching unit 120 may identify a characteristic, a VLAN ID, an MPLS label, an IP address pair, an IPv4 type of service, or an IPv6 traffic class, of the matching packets associated with the unusual latency and add or switch lo a filter condition based on this characteristic. For example, if analysis shows that matching packets having a VLAN ID of 123 are associated with an unusually high maximum latency, a maximum latency greater than a predetermined threshold, at a certain time of day, the packet-matching unit 120 will switch to a filter condition capturing only VLAN ID 123 traffic.

A user interface, e.g., a graphical user interface (GUI), may be implemented as pan of the packet-matching unit 120 or the optional packet-routing engine 130, or separately. The user interface allows a user to select the probes 110 to be used, to set the fillers at those probes 110, and to specify time intervals and thresholds for the packet-matching unit 120. The user interface also receiver, results from the packet-matching unit 120 and provides those results to the user.

Of course, numerous other embodiments may he envisaged without departing from the spirit and scope of the invention.

We claim:
1. A method, comprising:
receiving, by a device, a first subset of a first plurality of packets,
the first plurality of packets being associated with a first location in a network;
receiving, by the device, a second subset of a second plurality of packets,
the second plurality of packets being associated with a second location in the network, and
the second location being different than the first location;
parsing, by the device, each packet in the first subset and the second subset to extract invariant header fields from an outermost header until a minimal set of invariant header fields is obtained, for each packet, that uniquely identifies each packet throughout the network within a particular time period,
the particular time period being long enough in duration to allow each packet to traverse the network, but short enough in duration to minimize a likelihood of a same packet signature from being computed for different packets;
determining, by the device, a packet signature from the minimal set of invariant header fields for each packet in the first subset and the second subset;
comparing, by the device, packet signatures associated with the first subset and packet signatures associated with the second subset to identify matching packets with a same packet signature in the first subset and the second subset;

determining, by the device, a latency between the first location and the second location in the network based on matching packets in the first subset and the second subset; and adjusting, by the device and based on the latency, a filter associated with capturing packets at the first location or the second location.

2. The method of claim 1, where each packet in the first subset and the second subset is parsed header by header from the outermost header inwards.

3. The method of claim 1, where:
at least some of the packets in the first subset have different protocol combinations,
at least some of the packets in the second subset have different protocol combinations, and
the minimal set of invariant header fields for each packet in the first subset and the second subset depends on a protocol combination of each packet.

4. The method of claim 1, where the minimal set of invariant header fields includes a source address field, a destination address field, and at least one additional invariant header field selected from an identifier and a sequence number.

5. The method of claim 1, further comprising:
applying a hash function to the minimal set of invariant header fields for each packet to determine the packet signature for each packet in the first subset and the second subset.

6. The method of claim 5, further comprising:
storing each packet in the first subset and the second subset in memory and in a hash table indexed by packet signature.

7. The method of claim 1, where a first timestamp is assigned to each packet in the first subset, a second timestamp is assigned to each packet in the second subset, and the method further comprises:
comparing a first timestamp and a second timestamp of matching packets in the first subset and the second subset to determine the latency between the first location and the second location in the network.

8. The method of claim 1, where:
the first subset and the second subset are selected based on the filter,
the filter including a first filter condition based on a first invariant header field selected from an identifier and a sequence number, and
the first filter condition defining at least one of an entire identifier, an entire sequence number, a subset of the identifier, or a subset of the sequence number.

9. The method of claim 8, further comprising:
counting each packet in the first subset and the second subset to obtain a total quantity of packets;
comparing the total quantity of packets to a predetermined threshold; and
when the total quantity of packets is less than the predetermined threshold, adding a second filter condition to the filter,
the second filter condition being based on a second invariant header field selected from another identifier and another sequence number, and
the second filter condition defining at least one of an entire identifier, an entire sequence number, a subset of the identifier, or a subset of the sequence number.

10. A device, comprising:
one or more processors to:
receive a first subset of a first plurality of packets,
the first plurality of packets being associated with a first location in a network;
receive a second subset of a second plurality of packets,
the second plurality of packets being associated with a second location in the network, and
the second location being different than the first location;
parse each packet in the first subset and the second subset to extract invariant header fields from an outermost header until a minimal set of invariant header fields is obtained, for each packet, that uniquely identifies each packet throughout the network within a particular time period,
the particular time period being long enough in duration to allow each packet to traverse the network, but short enough in duration to minimize a likelihood of a same packet signature from being computed for different packets;
determine a packet signature from the minimal set of invariant header fields for each packet in the first subset and the second subset;
compare packet signatures associated with the first subset and packet signatures associated with the second subset to identify matching packets with a same packet signature in the first subset and the second subset;
determine a latency between the first location and the second location in the network based on matching packets in the first subset and the second subset; and
adjust, based on the latency, a filter associated with capturing packets at the first location or the second location.

11. The device of claim 10, where:
at least some of the packets in the first subset have different protocol combinations,
at least some of the packets in the second subset have different protocol combinations, and
the minimal set of invariant header fields for each packet in the first subset and the second subset depends on a protocol combination of each packet.

12. The device of claim 10, where the minimal set of invariant header fields includes a source address field, a destination address field, and at least one additional invariant header field selected from an identifier and a sequence number.

13. The device of claim 10, where the one or more processors are further to:
apply a hash function to the minimal set of invariant header fields for each packet to determine the packet signature for each packet in the first subset and the second subset.

14. The device of claim 10, where a first timestamp is assigned to each packet in the first subset, a second timestamp is assigned to each packet in the second subset, and the one or more processors are further to:
compare a first timestamp and a second timestamp of matching packets in the first subset and the second subset to determine the latency between the first location and the second location in the network.

15. A system, comprising:
one or more devices to:
receive a first subset of a first plurality of packets,
the first plurality of packets being associated with a first location in a network;

receive a second subset of a second plurality of packets,
  the second plurality of packets being associated with
    a second location in the network, and
  the second location being different than the first
    location;
parse each packet in the first subset and the second
  subset to extract invariant header fields from an
  outermost header until a minimal set of invariant
  header fields is obtained, for each packet, that
  uniquely identifies each packet throughout the network within a particular time period,
  the particular time period being long enough in
    duration to allow each packet to traverse the
    network, but short enough in duration to minimize
    a likelihood of a same packet signature from being
    computed for different packets;
determine a packet signature from the minimal set of
  invariant header fields for each packet in the first
  subset and the second subset;
compare packet signatures associated with the first
  subset and packet signatures associated with the
  second subset to identify matching packets with a
  same packet signature in the first subset and the
  second subset;
determine a latency between the first location and the
  second location in the network based on matching
  packets in the first subset and the second subset: and
adjust, based on the latency, a filter associated with
  capturing packets at the first location or the second
  location.

16. The system of claim 15, where the one or more devices are further to:
apply a hash function to the minimal set of invariant header fields for each packet to determine the packet signature for each packet in the first subset and the second subset.

17. The system of claim 15, where a first timestamp is assigned to each packet in the first subset, a second timestamp is assigned to each packet in the second subset, and the one or more devices are further to:
compare a first timestamp and a second timestamp of matching packets in the first subset and the second subset to determine the latency between the first location and the second location in the network.

18. The system of claim 15, where:
at least some of the packets in the first subset have different protocol combinations,
at least some of the packets in the second subset have different protocol combinations, and
the minimal set of invariant header fields for each packet in the first subset and the second subset depends on a protocol combination of each packet.

19. The system of claim 15, where the minimal set of invariant header fields includes a source address field, a destination address field, and at least one additional invariant header field selected from an identifier and a sequence number.

20. The system of claim 15, where:
the first subset and the second subset are selected based on the filter,
  the filter including a first filter condition based on a first invariant header field selected from an identifier and a sequence number, and
  the first filter condition defining at least one of an entire identifier, an entire sequence number, a subset of the identifier, or a subset of the sequence number.

\* \* \* \* \*